United States Patent
Khanna et al.

(12) 
(10) Patent No.: US 9,484,979 B2
(45) Date of Patent: Nov. 1, 2016

(54) SWITCHING BETWEEN TRANSMIT AND RECEIVE MODES IN A WIRELESS TRANSCEIVER

(75) Inventors: Saurabh Khanna, Bangalore (IN); Sarma Sundareswara Gunturi, Bangalore (IN); Vijaya Sarathy Bergai ParthaSarathy, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1245 days.

(21) Appl. No.: 12/714,153

(22) Filed: Feb. 26, 2010

(65) Prior Publication Data

US 2011/0211620 A1    Sep. 1, 2011

(51) Int. Cl.
*H04B 1/46* (2006.01)
*H04L 5/00* (2006.01)

(52) U.S. Cl.
CPC .............. *H04B 1/46* (2013.01); *H04L 5/0098* (2013.01); *H04L 5/0007* (2013.01); *H04L 5/0096* (2013.01)

(58) Field of Classification Search
USPC ............... 370/311, 252, 338; 455/1, 522
See application file for complete search history.

(56) References Cited

U.S. PATENT DOCUMENTS

| | | | |
|---|---|---|---|
| 2002/0086635 A1* | 7/2002 | Tomono | 455/1 |
| 2005/0047357 A1* | 3/2005 | Benveniste | 370/311 |
| 2006/0142038 A1* | 6/2006 | Ozarow et al. | 455/522 |
| 2008/0019344 A1* | 1/2008 | Palm et al. | 370/338 |
| 2010/0080158 A1* | 4/2010 | Stahl | 370/311 |
| 2011/0026416 A1* | 2/2011 | Tazebay et al. | 370/252 |

OTHER PUBLICATIONS

"Cortex™-M3 Technical Reference Manual", http://infocenter.arm.com/help/topic/com.arm.doc.ddi0337g/Ciheigbf.html, Copyright © 2005-2008 ARM Limited, p. 1.
"Cortex™-M3 Technical Reference Manual", http://infocenter.arm.com/help/topic/com.arm.doc.ddi0337g/Babjagdg.html, Copyright © 2005-2008 ARM Limited., p. 1.

* cited by examiner

*Primary Examiner* — Albert T Chou
(74) *Attorney, Agent, or Firm* — Ronald O. Neerings; Frank D. Cimino (57) ABSTRACT

A wireless transceiver decodes a receive signal to extract data contained in the receive signal. A processing block contained in the wireless transceiver then initiates a power-ON of the transmit radio portions of the transceiver prior to initiating a power-OFF of the receive radio portions. The technique enables the transceiver to meet timing requirements when operating in environments that require an acknowledgement to be sent in response to receipt of data.

20 Claims, 5 Drawing Sheets

| OPERATION | TIME TAKEN (IN MICROSECONDS) |
|---|---|
| RECEIVER RF TO RECEIVER BASESBAND DELAY | 0.03 |
| SIGNAL DECODING AT RECEIVER BASEBAND | 5 |
| DATA VALID AND ACKNOWLEDGEMENT DECISION | 0.7 |
| TRANSMITTER BASEBAND TO TRANSMITTER RF DELAY | 0.03 |

SWITCHING BETWEEN TRANSMIT AND RECEIVE MODES IN A WIRELESS TRANSCEIVER

BACKGROUND

1. Technical Field

Embodiments of the present disclosure relate generally to wireless transceivers, and more specifically to techniques for switching between transmit and receive modes in a wireless transceiver.

2. Related Art

A wireless transceiver is generally a device that contains both a receiver and a transmitter, and receives and transmits signals wirelessly on a wireless medium. The transmitter of a wireless transceiver may often be non-operational when the receiver is processing (e.g., down-converting and demodulating) a received signal, and the transceiver may be said to be in a receive mode. Similarly, the receiver of the wireless transceiver may be non-operational when the transmitter is processing (e.g., modulating, up-converting and power-amplifying) a signal to be transmitted, and the transmitter may said to be in a transmit mode.

To minimize power consumption, at least some of the components in the receiver may be powered-OFF when the transceiver is in the transmit mode. Similarly, at least some of the components in the transmitter may be powered-OFF when the transceiver is in the receive mode. Switching between transmit and receive modes may, therefore, require powering-ON and powering-OFF respectively of the corresponding receiver and transmitter portions or components. The powering-OFF and powering-ON may be complete or partial, based, for example, on the specific implementation of the wireless transceiver. Thus, powering-OFF may correspond to removal of power for all of the corresponding powered-OFF components/blocks, or only removal of power for some components/blocks (for example, high power-consumption components/blocks) while maintaining other components/blocks in a powered-ON (or low-power/idle) state. Alternatively, power-OFF may also correspond to setting all or some of the components/blocks in a low-power (e.g., idle) states. Similarly, powering-ON may correspond to restoration or application of power to all or only some of the corresponding components/blocks from a no-power, low-power or idle states to full/normal power. Switching between transmit and receive modes may need to be performed fast enough to conform to one or more operational requirements of the transceiver.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

According to an aspect, a wireless transceiver extracts data contained in a received signal. A processing block contained in the wireless transceiver then initiates a power-ON of the transmit radio portions prior to initiating a power-OFF of the receive radio portions of the transceiver.

The techniques enable the transceiver to meet timing requirements when operating in environments that require an acknowledgement to be sent in response to receipt of data. In an embodiment, the features are provided consistent with IEEE 802.11 standards.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

BRIEF DESCRIPTION OF THE VIEWS OF DRAWINGS

The drawing in which an element first appears is indicated by the leftmost digit(s) in the corresponding reference number.

DETAILED DESCRIPTION

Various embodiments are described below with several examples for illustration.

1. Example Environment

Figure 1:
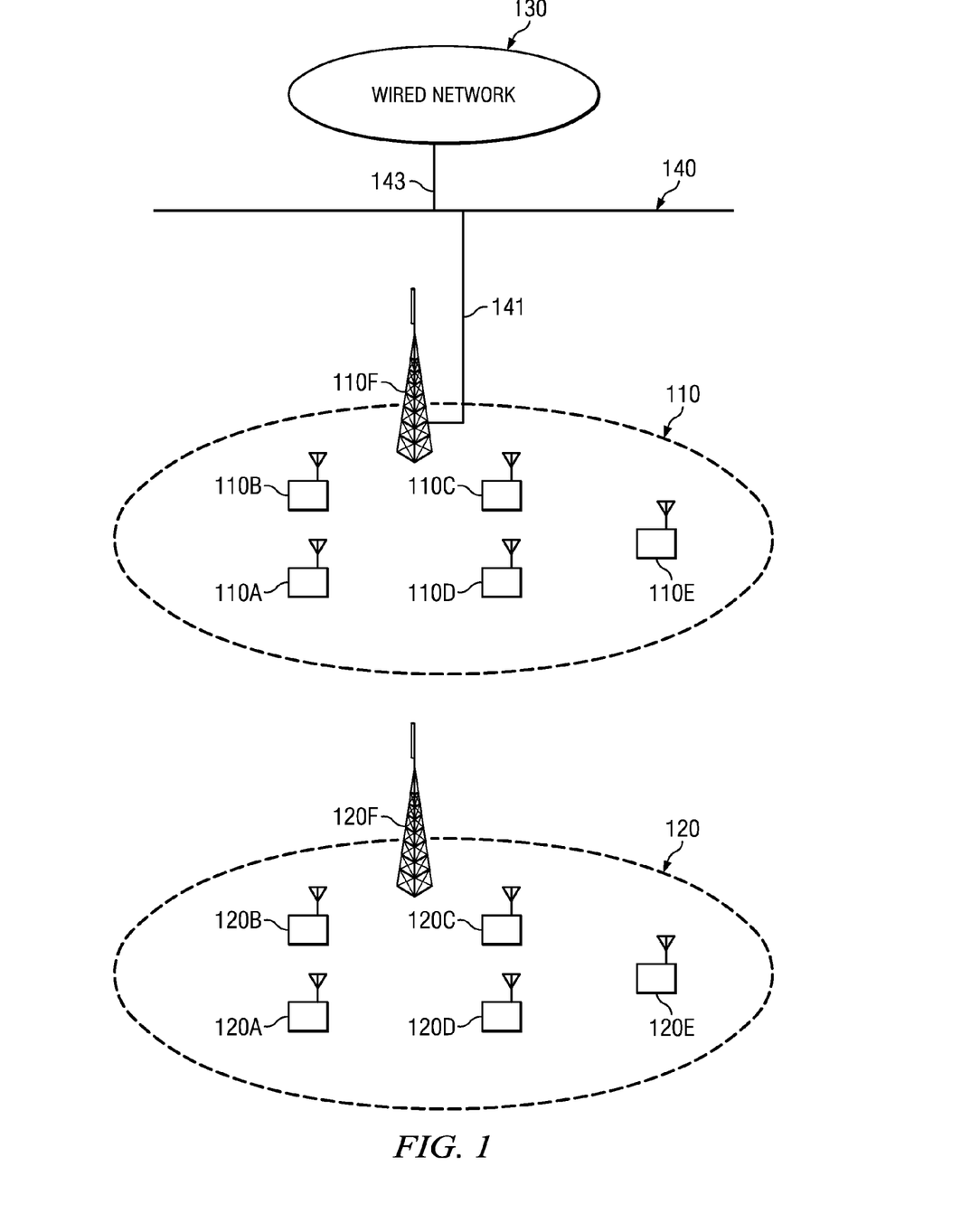
FIG. 1 is a block diagram of an example environment in which several embodiments can be implemented.

FIG. 1 is a block diagram illustrating an example environment in which several embodiments may be implemented. The example environment is shown containing only representative systems for illustration. However, real-world environments may contain many more systems/components as will be apparent to one skilled in the relevant arts. Further, in the description below, the transceivers and the environment are described as operating consistent with IEEE 802.11, merely for illustration. Implementations in other environments are also contemplated to be within the scope and spirit of various aspects of the present invention.

The diagram is shown containing two Basic Service Sets (BSS) 110 and 120, wired network 130, and wired network backbone 140. In the example environment shown in FIG. 1, the respective components are assumed to be designed to operate consistent with the 802.11 WLAN standards (including revisions such as 802.11a, 802.11b, 802.11g., 802.11n, etc.). However, the features can be implemented in various other environments as well.

BSS 110 contains wireless transceivers 110A through 110E, and access point (AP) 110F. Each of wireless transceivers 110A through 110E may be any electronic/computing device (mobile or fixed) equipped with a wireless network interface card (or similar hardware) that enables wireless communication. For example, wireless transceivers 110A through 110E may include devices such as laptops, desktops, Personal Digital Assistants (PDA), etc.

AP 110F is connected by a wired medium (141) to wired network backbone 140, which in turn is connected to wired network 130. AP 110F provides wireless transceivers 110A through 110E connectivity with each other. Thus, for example, if wireless transceiver 110A is to communicate (transfer data to) with wireless transceiver 110C it may do so by first communicating with AP 110F, which in turn communicates with wireless transceiver 110C. Thus, a wireless transceiver (any of 110A-110E) wanting to communicate with another wireless transceiver in BSS 110 may do so via AP 110F. AP 110F also provides wireless transceivers 110A-110E connectivity to wired network 130 and transceivers in BSS 120. Each of wireless transceivers 110A through 110E in BSS 110 may also communicate with each other directly, without requiring the presence of AP 110F.

BSS 120 and constituent components wireless transceivers 120A through 120E and AP 120F operate in a manner similar to that described above with respect to BSS 110, and the related description is not repeated here for the sake of conciseness.

All transceivers in BSS 110 and BSS 120 may communicate with each other on a shared frequency band such as the 2.4 GHz (or 5.1 GHz) band specified by the WLAN standard. The transceivers could be operating in the same channel or different channels (adjacent or overlapping) within the shared band.

To conserve power, the transmitters of transceivers in FIG. 1 may be powered-OFF during a "receive time interval". A receive time interval is an interval in which a device (e.g., wireless device 110A) receives signals. The receivers in the transceivers may similarly be powered OFF during a "transmit time interval". A transmit time interval is an interval in which a device (e.g., wireless device 110A) transmits signals. Wireless communication environments and protocols often require that an acknowledgement be transmitted in response to receiving a "receive" signal, for example a received data packet. For example, IEEE 802.11 requires that an ACK (acknowledgement) signal be transmitted in response to reception of a valid data packet. Thus, after reception of valid "receive" data, the receiver portion of a transceiver of FIG. 1 may need to be powered OFF (to minimize power consumption), and its transmitter powered ON, so that the ACK can be transmitted. As noted above, the powering-OFF and powering-ON may be complete or partial. A power-OFF may correspond to removal of power for all or only some components/blocks, or to setting all or some of the components/blocks in a low-power (e.g., idle) states. Similarly, power-ON may correspond to restoration/application of power to the corresponding components/blocks from a no-power, low-power or idle states to full/normal power for all or only some components/blocks. How quickly the transceiver needs to start the acknowledgement (after end of receipt of the receive signal) may be stipulated by the specific operational environment, and hence the time interval in which to power-ON transmitter portions of a transceiver and power-OFF the receiver portions. For example, the requirements specified by the 802.11 standard are illustrated in the timing diagram of FIG. 2.

Figure 2:
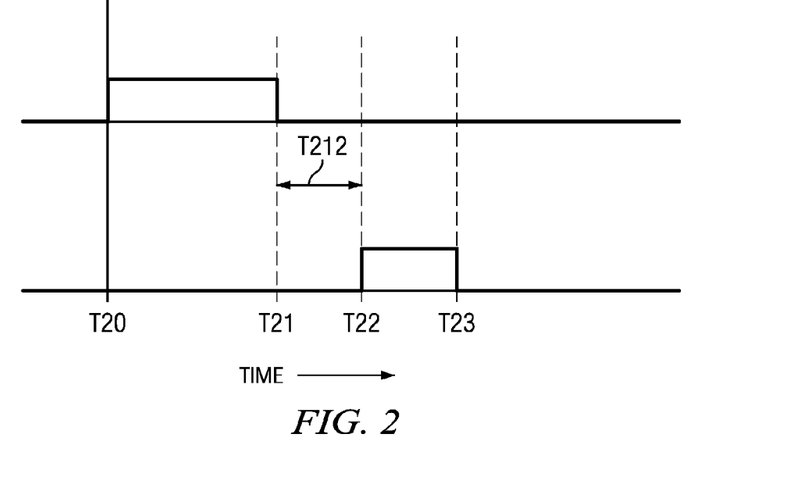
FIG. 2 is a timing diagram illustrating the timing relationship between a data signal and a corresponding acknowledgement signal.

With respect to FIG. 2, it is assumed that AP 110F (or any of transceivers 110B-110E) transmits a data frame addressed to transceiver 110A in time interval t20-t21. Transceiver 110A may thus be in "receive mode", with the transmitter (transmit components or portion) being powered-OFF (to minimize power consumption), and the receiver (receive components or portion) being powered-ON in interval t20-t21. According to 802.11 standard, in DCF (Distributed Coordination Function) based medium access, wireless transceiver 110A, on receiving the data frame, is required to transmit to the sender of the data frame an acknowledgment signal if the data frame is received and decoded without any errors. Further, the standard specifies that the acknowledgement signal must start at time instance t22, i.e., (exactly, or with predefined error tolerance) after a time interval t21-t22 (also marked as t212 in FIG. 2), termed an SIFS (Short Inter Frame Spacing) interval, as measured from the end (at t21) of the data frame. The interval t21-t22 may be measured from the end (t21) of receipt of data at the antenna of transceiver 110A to start (t22) of transmission of the acknowledgement also at the antenna of transceiver 110A.

Hence, in interval t21-t22, the receive portion of transceiver 110A may be required to be powered-OFF, the transmit portion powered-ON, and acknowledgement signal is to "start on air" at t22. The time taken to change operating modes, i.e., from receive portions ON (and transmit portions OFF) to transmit portions ON (and receive portions OFF), may be viewed as "receive-to-transmit turnaround time". However, in addition to performing the required receive-to-transmit turnaround, interval t21-t22 may also need to accommodate various other operations or delays, as shown with an example in FIG. 3.

Figure 3:
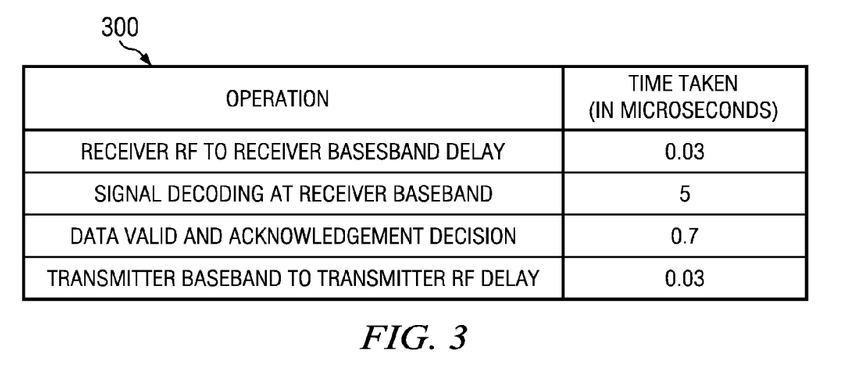
FIG. 3 shows a table containing delay values of several operations involved in an acknowledgement transmission in a transceiver.

As shown in table 300 of FIG. 3, the time taken for the signal to travel from receiver RF (radio) portion to receiver (digital) baseband portion may consume 0.03 microseconds. The time taken for the last portion of the received signal (e.g., last data symbol transmitted on air) to be decoded in the receiver baseband may consume 5 microseconds. The time taken for the receiver to determine whether the received data are valid or not and if an acknowledgement is to be sent may consume 0.7 microseconds. Validity of data may be determined for, example, by comparing a received CRC checksum with a computed checksum. The time taken for the acknowledgment signal to travel from the transmitter baseband portion to the transmitter RF portion and to thence to be transmitted on air may consume 0.03 microseconds.

The operations shown in table 300 add up to 5.76 microseconds. Assuming, interval t212 is 10 microseconds (as in the case of SIFS interval in the 802.11b context), the time available for performing the receive-to-transmit turnaround (receive-to-transmit turnaround time/interval) is 4.24 microseconds. The 4.24 microseconds includes time taken by analog/RF components in the transmit portions of a transceiver to 'settle' to their quiescent operating states (fully operational states) after power-ON. It is noted here that the 802.11 standard specifies only that the acknowledgement packet start at t22, and does not require the receive portions to be powered-OFF by t22. However, for minimizing power consumption, it may be desired that the receive portions be powered-OFF as soon as possible after end of receive operations.

According to a prior approach, a hardware state machine in a wireless transceiver performs the receive-to-transmit turnaround by first powering OFF the receive portions, followed by powering-ON of the transmit portions. However the approach may be associated with some drawbacks, such as increased implementation area, and lesser flexibility in controlling the time taken to execute the operations. Further, there may also be lesser flexibility in changing the sequence/order in which receive and transmit blocks/components are enabled/disabled. For example, any change in sequence/order may require redesign (silicon revision), and therefore have a higher cost associated with it.

In general, longer receive-to transmit turnaround time may require that the transceiver, and in particular the receiver baseband portions, be implemented to tighter specifications, thereby rendering the overall transceiver design more complex, expensive and which may consume more power. Further, the requirement for faster receive-to transmit turnaround may become even more critical when multiple receive chains (operating in parallel) need to be powered-OFF and multiple transmit chains powered-ON, as for example, in the context of IEEE 802.11n.

Several aspects of the present invention overcome one or more of the drawbacks noted above, as described next.

3. Receive-to-Transmit Turnaround

Figure 4:
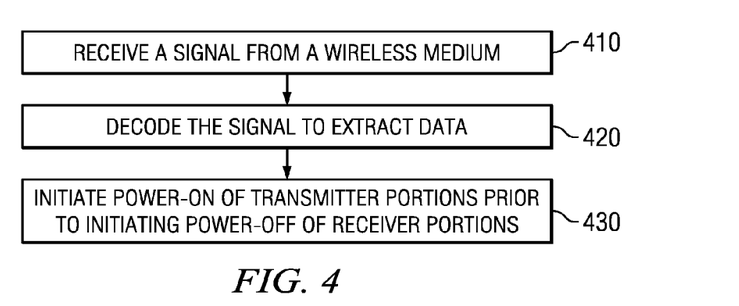
FIG. 4 is a flowchart illustrating the manner in which receive-to-transmit turnaround is performed, in an embodiment.

FIG. 4 is a flow diagram illustrating the manner in which receive-to-transmit turnaround is performed, in an embodiment of the present invention. The flow diagram is described with respect to the environment of FIG. 1, merely for illustration. However, various features described herein can be implemented in other environments and using other components, as will be apparent to one skilled in the relevant arts by reading the disclosure provided herein.

Further, the steps in the flow diagram are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein.

In step 410 according to the flow diagram, a wireless transceiver receives a signal (a receive signal) from another wireless device (e.g., an access point) over a wireless medium. The transmitter portions may be in a power-OFF state during reception of the 'receive' signal. Control then passes to step 420.

In step 420, the wireless transceiver decodes the 'receive' signal to extract data contained in the 'receive' signal. Control then passes to step 430.

In step 430, the wireless transceiver initiates power-ON of the transmitter portions prior to initiating power-OFF of the receiver portions. In an embodiment, the wireless transceiver performs the initiating of power-ON and power-OFF of the respective portions after the decoding of step 420 is complete.

Thus, according to an aspect of the present invention, (initiation of) power-ON of the transmitter portions of a transceiver is performed before power-OFF of the receiver portions. After power-ON of the transmitter portions, the wireless transceiver transmits an acknowledgement signal as a response to the received data, provided the data has been determined valid. Performing the power-ON of the transmitter portions prior to power-OFF of the receiver portions enables the wireless transceiver to comply with the requirement of being able to transmit an acknowledgement signal at the predetermined time instance. With respect to IEEE 802.11 standards, the predetermined time instance occurs at the end of the SIFS interval illustrated above with respect to FIG. 2.

It is noted that the powering OFF of the receive portions only after powering ON of the transmitter portions may translate to higher power consumption, at least during the interval in which both the receive and transmit portions are simultaneously in a power-ON state. However, performing the power-ON of the transmit portions first provides several benefits, in addition to enabling compliance with operational standards (such as 802.11), as illustrated in sections below.

4. Wireless Transceiver

Figure 5:
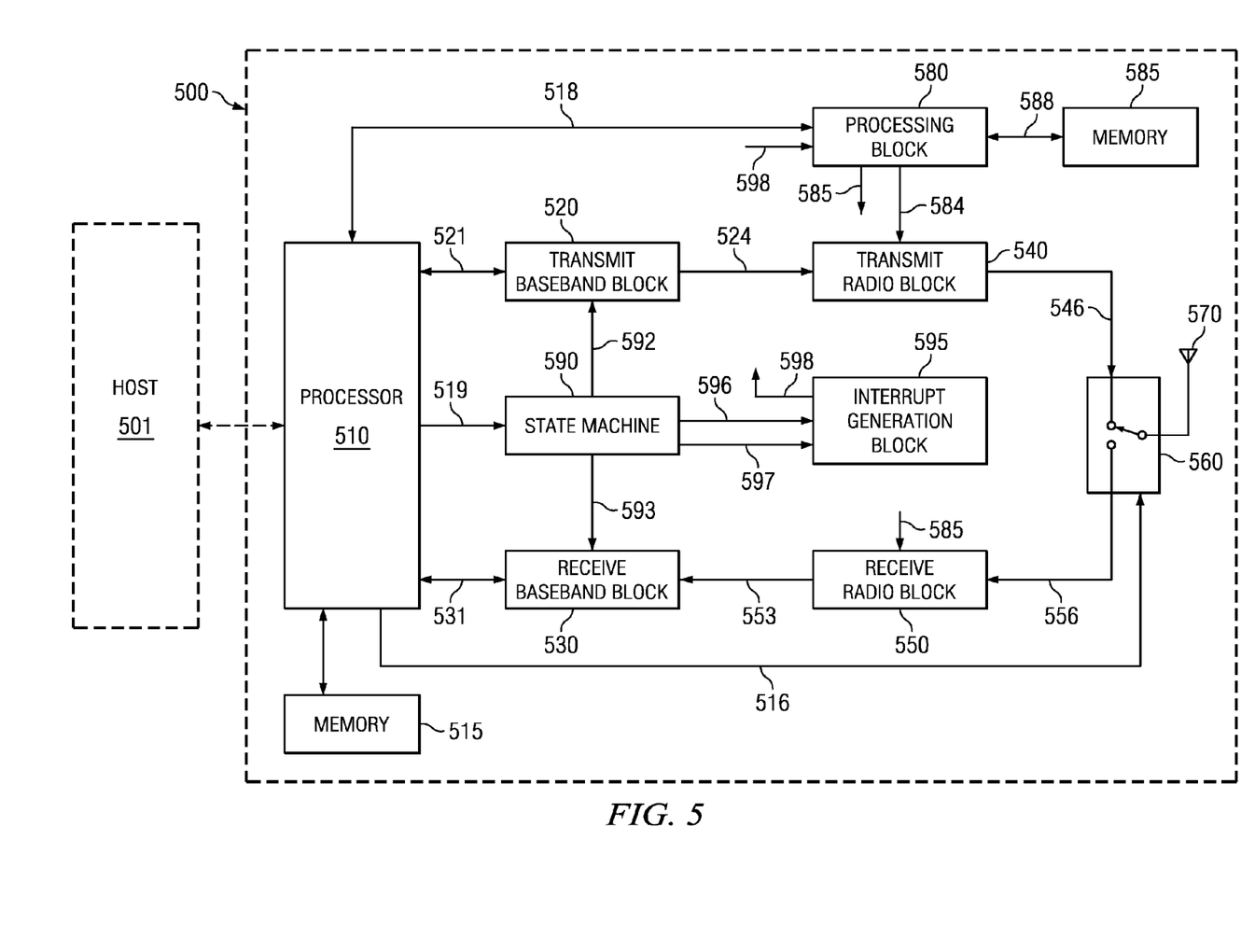
FIG. 5 is block diagram illustrating the internal details of a wireless transceiver, in an embodiment.

FIG. 5 shows a block diagram of a wireless transceiver 500 in an embodiment of the present invention. In addition, FIG. 5 also shows a host 501. Wireless transceiver 500 is shown containing processor 510, memory 515, transmit baseband block 520, receive baseband block 530, transmit radio block 540, receive radio block 550, switch 560, antenna 570, processing block 580, memory 585, state machine (also termed PHY sequencer) 590 and interrupt generation block 595. The components/blocks of wireless transceiver 500 are shown merely by way of illustration. However, wireless transceiver 500 may contain more or fewer components/blocks, as well. For ease of reference, the combination of blocks/components 540, 550, 560, and 570 may be viewed as a radio portion of wireless transceiver 500. Components/blocks 520 and 530 may be viewed as a baseband portion of wireless transceiver 500.

Similarly, the combination of blocks 520 and 540 may be viewed as a transmit portion (transmitter), while the combination of blocks 530 and 550 may be viewed as a receive portion (receiver). Further, processor 510 may execute instructions stored in memory 515 to implement medium access control (MAC) layer operations. Processor 510 in conjunction with transmit baseband block 520 and receive baseband block 530 implements (substantially most of the) the physical layer (PHY) operations of transceiver 110A.

Host 501 may be any electronic device, and perform corresponding operations. For example, host unit 501 may be a PDA (personal digital assistant), and may contain various input/output (e.g., keys, display panels, audio/video output, etc.) components or just interfaces for the corresponding components. Host 501 communicates over a wireless medium through wireless transceiver 500. Host 501 may be implemented only optionally, and the operations of host 501 may instead be performed by processor 510 and/or processing block 580.

Antenna 570 operates to receive as well as transmit, in corresponding non-overlapping intervals, signals to a wireless medium. Switch 560 may be controlled by processor 510 (connection not shown) to connect antenna 570 either to receive radio block 550 via path 556, or to transmit radio block 540 via path 546 depending on whether wireless device 110-A is to receive or transmit. Alternatively, the above noted control of switch 560 may instead be performed by processing block 580.

Receive radio block 550 receives an RF signal (receive signal) carrying data packets from a wireless medium on path 556 from antenna 570, demodulates the RF signal, performs analog-to-digital conversion, and provides a down-converted baseband digital signal carrying data to receive baseband block 530 on path 553. Receive baseband block 530 performs, on the baseband digital signal received on path 553, operations such as filtering (to remove noise), DC offset removal, de-interleaving, error correction, and decoding the received signal (for example, using fast Fourier transform assuming OFDM techniques are employed) to extract data packets from the baseband signal. Receive baseband block 530 forwards the data packets to processor 510 on path 531. The operation of some or all functions of (baseband blocks 520 and 530 may be controlled by processor 510, via paths 521 and 531 respectively. 10501 Transmit baseband block 520 receives data to be transmitted from processor 510 on path 521, performs operations on the data such as scrambling, interleaving, IFFT (inverse fast Fourier transform assuming OFDM techniques are employed), and sends digital data samples (in-phase and quadrature) to transmit radio block 540 on path 524. Transmit radio block 540 receives the signal(s) from transmit baseband block 520, performs operations such as digital-to-analog conversion of the signal(s), up-conversion, power amplification, transmit filtering, etc., to generate an RF signal. Transmit radio block 540 provides an up-converted RF signal carrying data packets to antenna 570 via switch 560 on path 546.

Processor 510 receives data packets on path 531 from receive baseband block 530, and processes the received data. Processing may include filtering of data in the data packets, Viterbi decoding, decryption of data (assuming data was transmitted in encrypted form), data integrity checks such as CRC checksum generation and comparison with the received checksum, etc. Processor 510 may forward the data to host 501. If host 501 is not implemented, processor 510 operates on the extracted data to provide desired features. In particular, processor 510 performs data integrity checks on data extracted by receive baseband block 530 (and received on path 531) to determine if an acknowledgement is to be transmitted or not.

Processor 510 generates data (or receives the data from host 501, if host 501 is implemented) for transmission, performs various operations such as encryption of data (assuming data is to be transmitted in encrypted form), addition of data integrity checksums etc., and forwards processed data packets to transmit baseband block 520 on path 521. In particular, processor 510 generates data/packets for an acknowledge signal if previously received data are determined to be valid (based, for example, on data integrity checks). Further, on determination that a received data packet is valid and hence requires an acknowledgment, processor 510 generates signals on path 519 to indicate to state machine 590 to power-ON transmit baseband block 520 and power-OFF receive baseband block 530, and also to generate signals 596 (RX-EN) and 597 (TX-EN).

Processor 510 provides a select signal on path 516 to switch 560, to connect antenna 570 either to receive radio block 550 or to transmit radio block 540, based on the desired mode of operation (receive mode or transmit mode). The instructions and data required for processor 510 to perform the operations noted above are provided by memory 5115, which may include volatile as well as non-volatile (e.g., ROM, Flash) memories.

State machine 590 receives commands from processor 510, on path 519, to control the power-ON/power-OFF states of transmit baseband block 520 and receive baseband block 530 via paths 592 and 593 respectively. In an embodiment, state machine 590 powers-OFF blocks 520 and 530 by gating-OFF (disabling) the respective clock signals (not shown) used to control the operations of blocks 520 and 530. State machine 590 powers-ON blocks 520 and 530 by enabling the respective clock signals used to control the operations of blocks 520 and 530. State machine 590, in response to commands received from processor 510 (on path 519), generates (or toggles) signal 596 (RX-EN) to indicate whether receive radio block 550 is to be powered-ON or powered-OFF. Similarly, state machine 590, in response to commands received from processor 510 (on path 519), generates (or toggles the level of) signal 597 (TX-EN) to indicate whether transmit radio block 540 is to be powered-ON or powered-OFF. In an alternative embodiment, processor 510 directly controls the ON/OFF states of transmit baseband block 520 and receive baseband block 530, and also provides to processing block 580 (on path 518, which may be connected to interrupt inputs of processing block 580) signals specifying power-ON and power-OFF states to be set for blocks 540 and 550.

Processing block 580 controls the power ON and/or power OFF of blocks 540 and 550 via corresponding control paths 584 and 585. The power ON/OFF control may be performed in a known way. In an embodiment, the power ON/power OFF of blocks 540 and 550 is done via sequential register writes (for example, to corresponding registers located in respective blocks 540 and 550) by processing block 580. Processing block 580 may be implemented as a general purpose processor (microprocessor), application specific processor (ASIC) or as a finite state machine. In an alternative embodiment, processing block 580 may not be implemented, and processor 510 directly controls the powering-ON and powering-OFF of blocks 540 and 550.

When processing block 580 is implemented as a microprocessor, the instructions and data required for processing block 580 to perform power ON and power OFF (as well as other desired functions) are provided by memory 585 via path 588. Memory 585 may include volatile as well as non-volatile (e.g., ROM, Flash) memories. In particular, memory 585 and memory 515 store instructions and data to provide several features of the present invention, and constitute computer (or in general, machine) readable media. Also, when implemented as a microprocessor, signals on path 598 are connected to interrupt inputs of processing block 580. In an embodiment, processing block 580 is implemented as ARM CORTEX M3 [™] processing core, the details of which are available at:

http://infocenter.arm.com/help/index.jsp?topic=/com.arm.doc.set.cortexm/index.html. However, in other embodiments, processing block 580 may be implemented to correspond to other processors, or as a finite state machine (FSM). When implemented as a finite state machine (FSM), the operations performed by the instructions in memory 585 are implemented in hardware. Further, although processing block 580 is noted above as performing the power-On and power-OFF operations noted above, in other embodiments, processing block 580 may not be implemented, and the functions of processing block 580 may instead be performed by processor 510.

Figure 6:
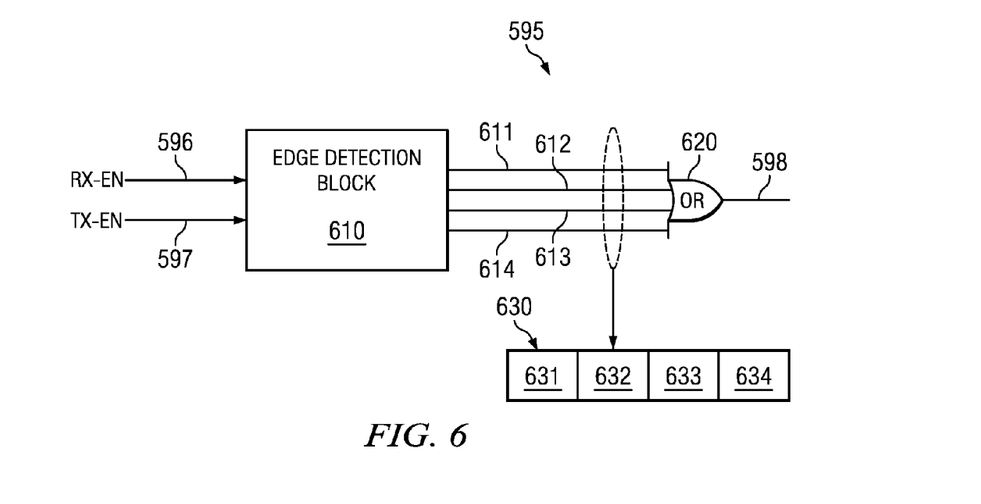
FIG. 6 is a block diagram illustrating the details of an interrupt generation block, in an embodiment.

Interrupt generation block 595 receives signals 596 and 597 and generates one or more interrupt signals on path 598, which are provided to interrupt input(s) of processing block 580. An embodiment of interrupt generation block 595 is shown in greater detail in FIG. 6. Interrupt generation block 595 is shown in FIG. 6 as containing edge detection block 610, OR gate 620 and register 630. Edge detection block 610 generates a logic high signal on the corresponding ones of output paths 611-614 based on logic-level transitions of signals on path 596 and 597.

Specifically, edge detection block 610 generates a logic high pulse on path 611 upon signal 596 (RX-EN) transitioning from logic low to logic high (the transition indicating that receive radio block 550 is to be powered ON), a logic high pulse on path 612 upon signal 596 (RX-EN) transitioning from logic high to logic low (the transition indicating that receive radio block 550 is to be powered OFF), a logic high pulse on path 613 upon signal 597 (TX-EN) transitioning from logic low to logic high (the transition indicating that transmit radio block 540 is to be powered ON), and a logic high pulse on path 614 upon signal 597 transitioning from logic high to logic low (the transition indicating that transmit radio block 540 is to be powered OFF).

OR gate 620 provides a logical OR output on path 598 (connected to an interrupt input of processing block 580) of the inputs on paths 611, 612, 613 and 614. The state transitions of signals 596, 597 are registered in storage locations 631, 632, 633, 634 (RX ON, RX OFF, TX ON, TX OFF) respectively of event status register 630. Thus, a logic transition of signals 596 and/or 597 can generate an interrupt to processing block 580.

The operations of wireless transceiver 500 in performing a receive-to-transmit turnaround are described next.

5. Timing Diagram

Figure 7:
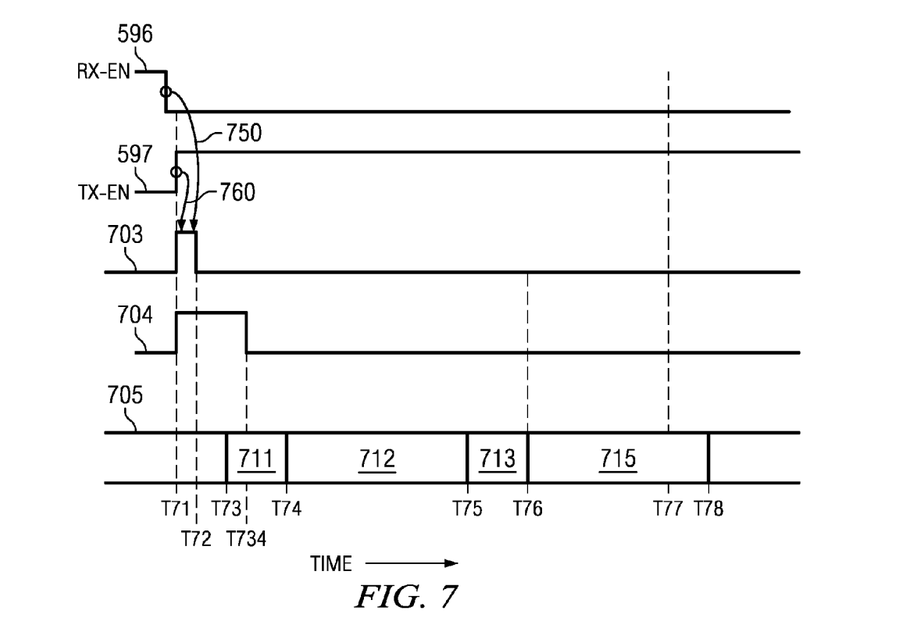
FIG. 7 is a timing diagram illustrating the timing of several signals in a transceiver during a receive-to-transmit turn-around interval, in an embodiment.

In an embodiment, receive-to-transmit turnaround is performed by the execution of instructions by processing block 580 implemented as an ARM CORTEX M3 [™] microprocessor. FIG. 7 is a timing diagram illustrating the relevant operations and their timing relationships in the embodiment. However, it is noted that in other embodiments using processors (or FSM) other than ARM CORTEX M3 [™], the specific timing details may be different.

With respect to FIG. 7, it is assumed that the receive portion of transceiver 500 has decoded a 'receive' signal, and processor 510 has determined that the received data are valid sometime slightly prior to time instance t71. State transitions (to power-ON and power-OFF respectively) of baseband blocks 520 and 530 may occur (performed for example, by processor 510 via state machine 590) parallely in time to state transitions (power-ON/OFF) of radio blocks 540 and 550. It is further assumed that additional delays incurred in other operations, and as noted above with respect to the table of FIG. 3, are incurred by wireless transceiver 500, and that the available time (interval t71 to t77 in FIG. 7) for power-ON and stabilization of all components in the transmit portion is 4.24 microseconds. It is rioted that the specific values of the delays and hence the time available for receive-to-transmit turnaround are provided by way of example. The values can be different in other operational environments, and when other transceiver implementations are employed.

At t71, signal 596 (RX-EN) is shown as transitioning to logic low (indicating that receive radio block 550 is to be powered-OFF, and signal 597 (TX-EN) is shown as transitioning to logic high (indicating that transmit radio block 540 is to be powered-ON). The respective transitions indicate that the received data (similar to data in interval t20-t21 in FIG. 2) have been determined to be valid, and that the receiver portion is to be powered OFF and the transmitter portions powered-ON, so that an acknowledgement (ACK) signal may be transmitted. The transitions of signals 596 and 597 generate logic high pulses on paths 612 and 613 (FIG. 6), and are also registered in locations 632 and 633 respectively of event status register 630 at t71.

In an embodiment, the logic level transitions 750 and 760 of signals 596 and 597 are each designed to occur not wider apart than a time interval equal to two clock cycles of the master clock of processing block 580, although visually, zero delay is depicted in FIG. 7 between the transitions. As a result of such generation of transitions 750 and 760, OR gate 620 generates only a single pulse (denoted as 703 in FIG. 7) on output path 598, which is provided as an interrupt to an interrupt input of processing block 580. Signal 704 going to logic high at t71 indicates that a change in logic level of one or more of signals 596 and 597 has occurred, i.e., at least one bit in event status register 630 is a logic high.

In response to interrupt signal 703, an interrupt service routine (ISR) is invoked at t73. Interval t72-t73 of waveform 705 represents the latency in actual start of the ISR, which occurs at t73. As is well known in the relevant arts, such latency may be incurred in saving the current execution context (e.g., values in the program counter, stack pointer, internal registers, etc.) of processing block 580.

In the embodiment illustrated with respect to FIG. 7, in interval t73-t734, corresponding instructions in the ISR read event status register 630 to determine that receive radio block 550 is to be powered OFF and transmit radio block is to be powered-ON, by determining that bits in storage locations 632 and 633 are high. The reading of event status register 630 clears the bits in locations 632 and 633, and signal 704 goes low at t734. Interval t734-t74 is consumed by execution of code used to determine the state transition required (i.e., whether transmit portions ON and receive portions OFF are to be performed or not), since a same interrupt input is used to signal all possible state transitions.

According to an aspect of the present invention, instructions in the single ISR first initiate power-ON of transmit radio block 540 prior to initiating power-OFF of receive radio block 550. In an embodiment, powering-ON of transmit radio block 540 is performed by a function called from within the ISR, while powering OFF of receive radio block 550 is performed by another function, also called from within the same ISR.

The first function call in the ISR performs, in interval 712 (t74 to t75), initiation of power-ON of one or more components in transmit radio block 540. T75 represents the time instance by which all commands (e.g., register writes to registers in transmit radio block 540, indicated as being performed on path 584) are complete. It is noted that the registers may correspond to power-control registers, which are always in a powered-ON state (when transceiver 500 is operational).

On initiation of power-ON (e.g., via register writes on path 584) the components within transmit radio block 540 may reach a full operational state after a short delay. The delay may include settling time for the analog/RF components in the block 540, and fully operational status of the components may be reached slightly later than t75, but much earlier than t77. The first function exits (starting at) at t75 after performing the power-ON operations noted above. Time interval 713 (t75 to t76) represents the time taken for exiting from the first function.

The single ISR then invokes (at t76) a second function call for power-OFF of receive radio block 550. The second function call performs power-OFF of one or more components of receive radio block 550, for example by writing to corresponding registers in receive radio block 550. T78 represents a time instance by which all components in the receive portion have been powered-OFF. Interval 715 (t76 to t78) is an interval in corresponding commands to power-OFF components in receive radio block 550 are provided. The second function exits at t78, followed by exit from the single ISR. It is noted that even though complete power-OFF of receive radio block 550 is effected later than t77 (which represents the end of the SIFS interval), this does not constitute a problem.

Since all transmit portions are powered ON and stabilized before t77 (i.e., at t75), the acknowledgement can be transmitted at the end of the SIFS interval (which occurs at t77), and the device to which the acknowledgement is addressed to can decode the acknowledgement correctly.

It is noted that in other embodiments, logic level transition 750 may be designed to occur much later than transition 760. In such embodiments separate interrupt instances to processing block 580 are generated, and corresponding ISRs are generated, a first (earlier) ISR in which the power-ON of one or more components in transmit radio block 540 are performed, and a second (later) ISR in which power-OFF of one or more components in receive radio block 550 is performed. When processing block 580 is implemented as ARM CORTEX M3 [™], if transition 750 occurs prior to exit from the ISR for power-ON corresponding to the (earlier) transition 760 (i.e., time instance t75 in FIG. 7), then no additional context saving is incurred in invoking the later ISR for power-OFF (as facilitated by the "tail-chaining" feature of ARM CORTEX M3 [™]. However, if transition 750 occurs after the exit from the ISR for power-ON corresponding to the (earlier) transition 760, then additional context saving is incurred prior to invoking the later ISR for power-OFF.

In an alternative embodiment, delays in state machine 590 are adjusted such that control signal 584 is caused to be activated (in the single ISR noted above) to initiate power-ON of transmit radio block 540 prior to powering-ON block 520 (via state machine 590 and path 592). In the alternative embodiment, delays in state machine 590 are also adjusted such that control signal 585 is caused to be activated to initiate power-OFF of receive radio block 550 prior to powering-OFF of block 530 (via state machine 590 and path 593). In other embodiments, initiation of power-OFF of both the blocks 530 and 550 may be initiated simultaneously. Similarly, initiation of power-ON of both the blocks 520 and 540 may be initiated simultaneously.

It may be appreciated that the techniques of powering-ON the transmit portions prior to the receive portions (specifically powering-ON of transmit radio block 540 prior to powering-OFF of receive radio block 550), and the technique of generating substantially simultaneously (or within a predetermined time interval of each other) interrupt events to indicate that receive radio block 550 is to be powered-OFF and transmit radio block 540 is to be powered-ON, so that both events are serviced in a single interrupt, enables transceiver 500 to meet the specified timing requirements of the SIFS interval.

In another embodiment, processing block 580 powers ON the components in transmit radio block 540 and powers-OFF components in receive radio block 550 in an interleaved manner, i.e., processing block 580 may power-ON some components of transmit radio block 540, then power-OFF some components of receive radio block 550, then power-ON the remaining components of transmit radio block 540, and then power-OFF the remaining components of receive radio block 550.

Figure 8:
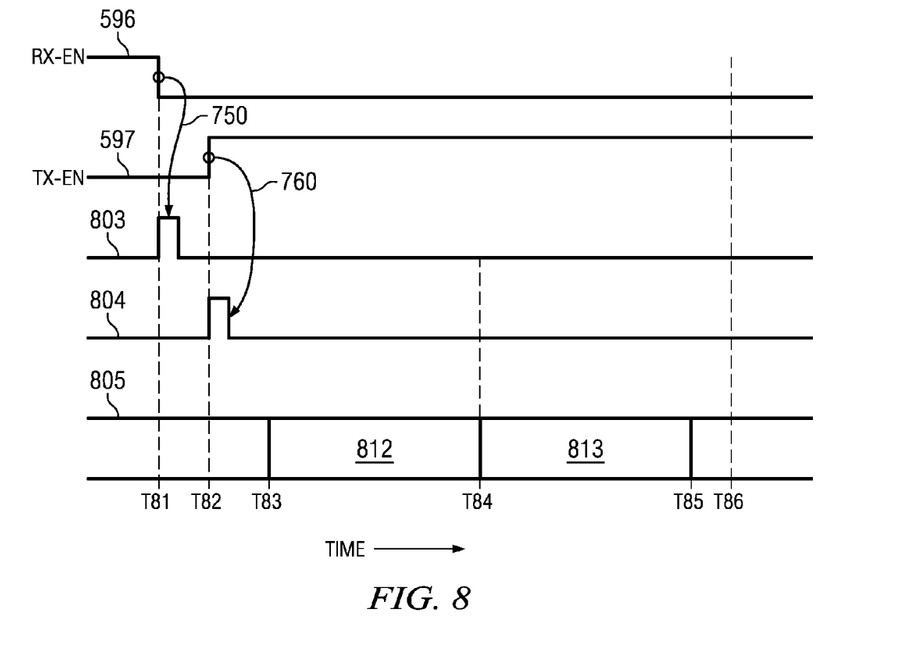
FIG. 8 is a timing diagram illustrating the timing of several signals in a transceiver during a receive-to-transmit turn-around interval, in another embodiment.

In yet another embodiment of the present invention illustrated with respect to FIG. 8, signals 596 and 597 are provided separately to two different interrupt inputs of processing block 580. The interrupt input corresponding to signal 597 (TX-EN) is set to have a higher priority than the interrupt input corresponding to signal 596 (RX-EN). In such an embodiment, two OR gates may be implemented (instead of the single OR gate 620 of FIG. 6), one with paths 611 and 612 as inputs, and the other with paths 613 and 614 as inputs. The output of each of the two OR gates (not shown) is provided to the two interrupt inputs (noted above) of processing block 580.

Figure 9:
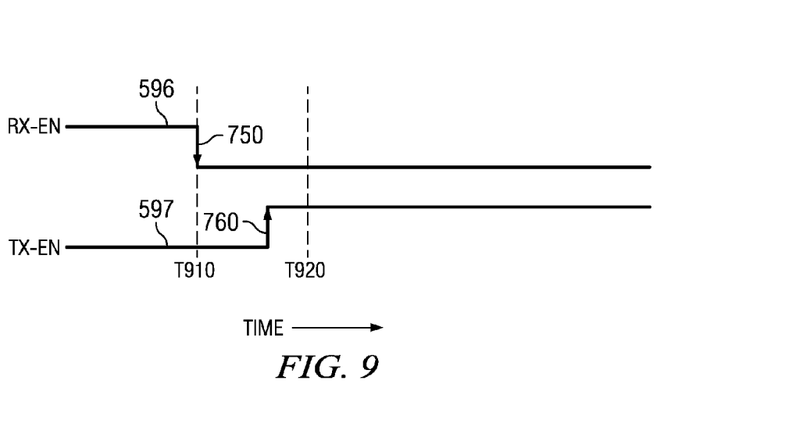
FIG. 9 is a timing diagram showing the time-relationship between interrupt events in an embodiment.

In an embodiment, and as shown in FIG. 9, the transitions of signals 596 and 597 are designed to occur not wider apart in time than a time interval t910 to t920, with the transition of signal 597 designed to occur later than the transition of signal 596. Thus, in the embodiment, assuming signal 596 transitions at t910 (as shown in FIG. 9), the transition of signal 597 is designed earlier than time instance t920. It is noted here that ARM CORTEX M3 [™] provides a feature by which a late-arriving interrupt can pre-empt a previous interrupt if the first instruction of the previous ISR has not entered the execute stage, and the late-arriving interrupt has a higher priority than the previous interrupt. Thus, in the embodiment, time interval t910 to t920 is designed to be not greater than a time interval from start of ISR corresponding to transition 596 to a time instance just prior to when the first instruction of the ISR enters the execution stage. In an embodiment, interval t910 to t920 (predetermined interval) equals the context saving time of processing block 580.

Referring now to FIG. 8, transition of signal 596 occurs at t81 and generates a corresponding interrupt signal 803. Transition of signal 597 occurs at t82 and generates a corresponding interrupt signal 804. Assuming zero delay between the occurrence of transitions of signals 596 (and 597) and the corresponding interrupt 803 (and 804), interrupts 803 and 804 are thus designed to occur within a time interval t910-t920 of each other. Assuming there are delays (e.g., unequal delays) from the transitions to the corresponding interrupt, the occurrences of the transitions of signals 596 and 597 are designed such that interrupts 803 and 804 occur within interval t910-t920 of each other.

Since interrupt signal 804 is provided to a higher priority interrupt input compared to the interrupt input to which interrupt signal 803 is provided, the ISR corresponding to interrupt 804 is invoked first, shown as starting at time interval t83 in FIG. 8. In interval 812 (t83-t84), processing block performs the powering-ON of one or more blocks in transmit radio block 540, the powering-ON operations ending at t84. Context or state saving is not performed for the late-arriving interrupt 804 because it has already been performed for the initial interrupt 803 and so does not have to be repeated. Interval t81-t83 represents a duration in which context saving is done (caused by interrupt 803). In duration 813, in which the ISR corresponding to interrupt 803 is executed, processing block 580 powers-OFF one or more components of receive radio block 550. T85 represents the time instance at which the ISR corresponding to interrupt 803 exits. Interval t81-t86 represents the 4.24 microsecond interval noted above.

It may be appreciated that the use of separate interrupts for power-ON and power-OFF as illustrated with respect to FIGS. 8 and 9 obviates the need for determination of the source of the interrupt, as is required (and performed in interval t73-t734) in the technique illustrated with respect to FIG. 7. As a result, the technique of FIGS. 8 and 9 may be able to perform transmit-to-receive-turnaround in an even shorten interval than the technique of FIG. 7.

It is noted that in the technique illustrated with respect to FIGS. 8 and 9, the ISRs executed in intervals needs to determine whether transmit components are to be powered-ON or powered-OFF, and thus some time is consumed in interval 812 in making such determination by reading event status register 630 (FIG. 6). Similar time consumption occurs in interval 813 in determining whether the receive components are to be powered-OFF- or powered-ON. In yet another embodiment of the present invention, such overhead (time consumption noted above) is avoided by providing each of the four signals 611-614 (of FIG. 6) to separate interrupt inputs of processing block 580 (with OR gate 620 not being implemented).

It is further noted that other variations of the approaches illustrated with respect to FIGS. 8 and 9 are also possible. For example, the transition of signal 597 may be instead be designed to occur at or earlier than the transition of signal 596. In such cases, the advantage of avoiding one context save (using the late arrival feature of ARM CORTEX) may not be obtainable. In such cases, the higher priority interrupt (corresponding to signal 597) will be serviced first, followed by servicing of the lower priority interrupt (corresponding to signal 596). In general, the specific interrupt order and the corresponding number of context restore/store operations depend on the specific implementation of processing block 580. Irrespective of the specific implementation however, by performing the power-ON of the transmit components earlier than the power-OFF of the receive components, transmission of acknowledgement can be started by the end of SIFS interval.

It is noted here that it may not be desirable to power-ON the transmit portions and power-OFF the receive portions simultaneously (in parallel), for example by execution of a single processor instruction, as the current surge from simultaneous power-ON and power-OFF might exceed acceptable limits and damage wireless transceiver 500. Further, the powering-ON and powering-OFF of at least some components in transmit radio block 540 and receive radio block 550 may need to be performed in a particular sequence, for example due to settling time constraints, design and stability constraints, etc. Hence, the power-ON and power-OFF described with respect to FIG. 7 may need to be performed sequentially. However, it is noted that to some extent the power-ON and power-OFF can be parallelized by designing the power ON/OFF control bits for transmit radio block 540 and receive radio block 550 to be located in a same (single) register.

The reduced receive-to-transmit turnaround time achieved using techniques described in detail above, provides the additional benefit of relaxing the design requirements of blocks of the wireless transceiver. For example, the processing throughput requirements of receive baseband block 530 may be relaxed, and in general, the design of wireless transceiver 500 may be rendered less complex. In general, faster receive-to-transmit turnaround time may provide more time for baseband processing, which may be desirable as future wireless standards supporting higher bitrates may necessitate more complex designs with higher group delays/latencies.

References throughout this specification to "one embodiment", "an embodiment", or similar language mean that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method implemented in a wireless transceiver, said wireless transceiver containing a first set of components in a receiver portion, and a second set of components in a transmitter portion, said method comprising:
    receiving a receive signal from a wireless medium;
    decoding said receive signal to extract data contained in said receive signal; and
    after said receiving, initiating a powering-ON of said second set of components prior to initiating a powering-OFF of said first set of components during a period of time said second set of components remains powered-ON.

2. The method of claim 1, wherein said wireless transceiver is designed to operate according to a standard which requires an acknowledgement to be transmitted at the end of a fixed interval in response to, and after receiving, a receive signal, said method further comprising:
    transmitting after said powering-ON, an acknowledgment signal to said receive signal.

3. A method implemented in a wireless transceiver designed to operate according to a standard which requires an acknowledgement to be transmitted at the end of a fixed interval in response to, and after receiving, a receive signal, said wireless transceiver containing a first set of components in a receiver portion, and a second set of components in a transmitter portion, said method comprising:
    receiving a receive signal from a wireless medium;
    decoding said receive signal to extract data contained in said receive signal; and
    after said receiving, initiating a powering-ON of said second set of components prior to initiating a powering-OFF of said first set of components, generating, based on said decoding, a set of signals to indicate that said second set of components is to be powered-ON and said first set of components is to be powered OFF, wherein signals in said set of signals are generated to occur within a predetermined time interval of each other, wherein said generating is performed after determining whether said data extracted by said decoding represent valid data, and wherein said initiating is performed in response to said set of signals; and
    transmitting after said powering-ON, an acknowledgment signal to said receive signal.

4. The method of claim 3, wherein said wireless transceiver is a WLAN transceiver operating according to IEEE 802.11 standards, and said time interval is a short interframe spacing (SIFS) interval.

5. The method of claim 4, wherein said first set of components are contained in a radio portion of said receiver portion, and said second set of components are contained in a radio portion of said transmitter portion.

6. The method of claim 5, wherein said initiating initiates power-ON of said second set of components and power-OFF of first set of components in an interleaved fashion.

7. The method of claim 4, wherein said initiating a powering-ON of said second set of components is performed in response to a first interrupt to a processing block, and said initiating a powering-OFF of said first set of components is performed in response to a second interrupt to said processing block,
    wherein said first interrupt and said second interrupt are not the same interrupt,
    wherein said first interrupt is designed to occur later than and within a pre-determined time interval of the occurrence of said second interrupt, said first interrupt set to have a higher priority than said second interrupt,
    wherein invocation of an interrupt service routine (ISR) corresponding to said first interrupt does not entail context save operations in said processing block.

8. A wireless transceiver comprising:
    a transmit block;
    a receive block; and
    a first processing block to control provision of power to a radio portion of said transmit block and a radio portion of said receive block,
    wherein said receive block receives a receive signal from a wireless medium and decodes said receive signal to extract data contained in said receive signal, and
    wherein said first processing block initiates, after said receive block extracts said data, a power-ON of components in said radio portion of said transmit block prior to initiating a power-OFF of components in said radio portion of said receive block during a period of time said components in said radio portion of said transmit block remain powered-ON.

9. The wireless transceiver of claim 8, wherein said transmit block transmits an acknowledgement signal as a response to said receive signal at the end of a desired time interval starting from the end of said receive signal, said wireless transceiver further comprising a second processing block to determine whether said data represent valid data or not, wherein said second processing block initiates, after said receive block extracts said data, a power-ON of components in a baseband portion of said transmit block and a power-OFF of components in a baseband portion of said receive block, wherein said wireless transceiver is a WLAN transceiver operating according to IEEE 802.11standards, and said time interval is a short inter-frame spacing (SIFS) interval.

10. The wireless transceiver of claim 9, wherein said first processing block is implemented as a finite state machine (FSM).

11. A wireless transceiver comprising:
a transmit block;
a receive block; and
a first processing block to control provision of power to a radio portion of said transmit block and a radio portion of said receive block, wherein said receive block receives a receive signal from a wireless medium and decodes said receive signal to extract data contained in said receive signal, wherein said first processing block initiates, after said receive block extracts said data, a power-ON of components in said radio portion of said transmit block prior to initiating a power-OFF of components in said radio portion of said receive block;
a second processing block to determine whether said data represent valid data or not, wherein said second processing block initiates, after said receive block extracts said data, a power-ON of components in a baseband portion of said transmit block and a power-OFF of components in a baseband portion of said receive block, wherein said wireless transceiver is a WLAN transceiver operating according to IEEE 802.11 standards, and said time interval is a short inter-frame spacing (SIFS) interval;
a state machine, wherein said state machine generates, if said data represent valid data, a set of signals to indicate that said radio portion and said baseband portion of said transmit block are to be powered-ON and said radio portion and said baseband portion of said receive block are to be powered OFF, wherein signals in said set of signals are generated to occur within a predetermined time interval of each other, wherein said first processing block initiates, in response to said set of signals, said power-ON and said power-OFF; and
wherein said transmit block transmits an acknowledgement signal as a response to said receive signal at the end of a desired time interval starting from the end of said receive signal.

12. The wireless transceiver of claim 11, wherein said first processing block is a microprocessor, said set of signals containing a first signal and a second signal, said wireless transceiver further comprising an interrupt generation block, wherein said state machine provides each of said first signal and said second signal to said interrupt generation block, wherein said interrupt generation block generates an interrupt signal in response to transitions in said first signal and said second signal, and provides said interrupt signal to an interrupt input of said microprocessor, and wherein said microprocessor executes, in a single interrupt service routine (ISR), power-ON of said radio portion of said transmit block, and power-OFF of said radio portion of said receive block.

13. The wireless transceiver of claim 11, further comprising:
a memory for storing instructions and data;
an antenna to receive and to transmit signals on said wireless medium; and
a switch to selectively couple an output of said transmit block and an input of said receive block to said antenna.

14. A machine readable medium storing one or more sequences of instructions in a wireless transceiver containing a first set of components in a receiver portion, and a second set of components in a transmitter portion, wherein execution of said one or more sequences of instructions by one or more processors contained in said wireless transceiver causes said wireless transceiver to perform the actions of:
receiving a receive signal from a wireless medium;
decoding said receive signal to extract data contained in said receive signal; and
after said receiving, initiating a powering-ON of said second set of components prior to powering-OFF of said first set of components during a period of time said second set of components remains powered-ON.

15. The machine readable medium of claim 14, wherein said wireless transceiver is designed to operate according to a standard which requires an acknowledgement to be transmitted at the end of a fixed time interval in response to, and after receiving, a receive signal, said one or more sequences of instructions by one or more processors contained in said wireless transceiver to further cause said wireless transceiver to perform the action of:
transmitting after said powering-ON, an acknowledgment signal to said receive signal, said transmitting being performed at the end of said fixed interval time interval, said fixed time interval starting from the end of said receive signal, said fixed time interval being specified by said standard.

16. A machine readable medium storing one or more sequences of instructions in a wireless transceiver containing a first set of components in a receiver portion, and a second set of components in a transmitter portion, said wireless transceiver designed to operate according to a standard which requires an acknowledgement to be transmitted at the end of a fixed time interval in response to, and after receiving, a receive signal, said one or more sequences of instructions by one or more processors contained in said wireless transceiver wherein execution of said one or more sequences of instructions by one or more processors contained in said wireless transceiver causes said wireless transceiver to perform the actions of:
receiving a receive signal from a wireless medium;
decoding said receive signal to extract data contained in said receive signal; and
after said receiving, initiating powering-ON and powering OFF of said second set of components and said first set of components in a sequential manner.

17. The machine readable medium of claim 16, further comprising:

generating, based on said decoding, a set of signals to indicate that said second set of components is to be powered-ON and said first set of components is to be powered OFF, wherein signals in said set of signals are generated to occur within a predetermined time interval of each other, wherein said generating is performed after determining whether said data extracted by said decoding represent valid data or not, and wherein said initiating is performed in response to said set of signals.

18. The machine readable medium of claim 17, wherein said wireless transceiver is a WLAN transceiver operating according to IEEE 802.11 standards, and said time interval is a short inter-frame spacing (SIFS) interval.

19. The machine readable medium of claim 17, wherein said first set of components are contained in a radio portion of said receiver portion, and said second set of components are contained in a radio portion of said transmitter portion.

20. The machine readable medium of claim 17, wherein said initiating a powering-ON of said second set of components is performed in response to a first interrupt to a processing block, and said initiating a powering-OFF of said first set of components is performed in response to a second interrupt to said processing block, wherein said first interrupt and said second interrupt are not the same interrupt, wherein said first interrupt is designed to occur coincident with or earlier than the occurrence of said second interrupt.

* * * * *